United States Patent
Furukawa

(10) Patent No.: US 9,602,278 B2
(45) Date of Patent: Mar. 21, 2017

(54) ENCRYPTION DEVICE, CIPHER-TEXT COMPARISON SYSTEM, CIPHER-TEXT COMPARISON METHOD, AND CIPHER-TEXT COMPARISON PROGRAM

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 165 days.

(21) Appl. No.: 14/129,871

(22) PCT Filed: May 29, 2012

(86) PCT No.: PCT/JP2012/063765
§ 371 (c)(1),
(2), (4) Date: Dec. 27, 2013

(87) PCT Pub. No.: WO2013/005505
PCT Pub. Date: Jan. 10, 2013

(65) Prior Publication Data
US 2014/0133651 A1 May 15, 2014

(30) Foreign Application Priority Data

Jul. 5, 2011 (JP) ................................ 2011-149520

(51) Int. Cl.
*H04L 29/06* (2006.01)
*H04L 9/08* (2006.01)
(Continued)

(52) U.S. Cl.
CPC .......... *H04L 9/0861* (2013.01); *G06F 21/602* (2013.01); *H04L 9/008* (2013.01)

(58) Field of Classification Search
CPC ...... H04L 9/008; H04L 9/0861; G06F 21/602
(Continued)

(56) References Cited

U.S. PATENT DOCUMENTS 7,000,111 B1 * 2/2006 Dent ........................ G06F 7/723
235/375
7,062,043 B1 * 6/2006 Solinas ................ H04L 9/3252
380/30

(Continued)

OTHER PUBLICATIONS

Lu et al., "Improved Lossless Data Hiding Mechanisms based on Block-based Hiding Algorithm, Double Hiding Strategy and Variable Control Technique" Journal of Computers vol. 20, No. 4, Jan. 2010; Jan. 6, 2010, pp. 1-10.*

(Continued)

*Primary Examiner* — Harunur Rashid
(74) *Attorney, Agent, or Firm* — McGinn IP Law Group, PLLC

(57) ABSTRACT

An encryption device calculates a derived key by taking a document as a numerical value and corresponding identifier as input values and generates a cipher-text-by-identifier acquired by encrypting the document through a calculation taking the documents as input values, and a comparison unit generates relative values used for a greater-than-and-less-than comparison assessment between the plain text and another plain text through a calculation using a second hash function taking the derived key and plain text as input values, generates a relative value cipher-text through a calculation taking the derived key, the identifier, and the relative value as input values, generates a character string constituted with the cipher-text-by- identifier and the relative value cipher-text as a cipher-text, restores the relative values corresponding to the different cipher-texts through calculations using the second hash function, and performs a greater-than-and-less-than assessment on the encrypted different plain texts.

11 Claims, 9 Drawing Sheets

(51) Int. Cl.
*H04L 9/00* (2006.01)
*G06F 21/60* (2013.01)

(58) Field of Classification Search
USPC .......................................... 380/44
See application file for complete search history.

(56) References Cited

U.S. PATENT DOCUMENTS

2006/0262933 A1* 11/2006 Furukawa ..................... 380/281
2008/0282096 A1* 11/2008 Agrawal et al. ............. 713/193

OTHER PUBLICATIONS

Alexandra Boldyreva, et al., "Order-Preserving Symmetric Encryption", [online], Proceedings of EUROCRYPT 2009, pp. 225-242, [retrieved on Jun. 14, 2012]. Retrieved from the Internet: <URL: http://www.iacr.org/archive/eurocrypt2009/54790225/54790225.pdf>.

Georgios Amanatidis, et al., "New Security Models and Provably-Secure Schemes for Basic Query Support in Outsourced Databases." DBSec 2007: pp. 14-30.

Dai Ikarashi et al., "Keiryo Kensho Kano 3-Party Hitoku Kansu Keisan no Koritsuka Oyobi Kore o Mochiita Secure na Database Shori", 2011 Nen Symposium on Dryptography and Information Security Yokoshu (CD-ROM), Jan. 25, 2011 (Jan. 25, 2011), 2C3-6, '5 Teian 2: Kensaku Protocol'.

Jun Furukawa, "Angoka Database ni Okeru Han'I Kensaku", 2012 Nen Symposium on Cryptography and Information Security Yokoshu (CD-ROM), Jan. 30, 2012 (Jan. 30, 2012), 3D1-2.

International Search Report in PCT/JP2012/063765 dated Jun. 26, 2012.

* cited by examiner

ENCRYPTION DEVICE, CIPHER-TEXT COMPARISON SYSTEM, CIPHER-TEXT COMPARISON METHOD, AND CIPHER-TEXT COMPARISON PROGRAM

TECHNICAL FIELD

The present invention relates to an encryption device which performs encryption of numeric data. More specifically, the present invention relates to a cypher-text comparison system for performing a greater-than-and-less-than assessment of different numeric data encrypted by the encryption device.

BACKGROUND ART

A database carries a great number of numeric data stored therein as the search target, and processing such as searching, extraction, and the like of the numeric data is performed in a database system in response to the requests made by users.

For example, in a database which stores and manages company-secret numeric data, the numeric data stored in the database is encrypted in order to suppress leakage and the like of the data to the third parties other than the legitimate users. In a case where each numeric data as the structural elements of the database is encrypted, it is possible to conceal the original numeric data itself from the third parties to some extent.

However, for example, when a cipher-text I in which numeric data is encrypted is compared with another encrypted cipher-text II, it is possible to assess the greater-than-and-less-than relation regarding the original numerical data which correspond to the cipher-texts I and II, respectively, through comparing the character strings contained in the both cipher-texts.

Further, through repeatedly executing the comparison processing of the greater-than-and-less-than relation by using various comparison target data, the numeric data itself corresponding to the cipher-text can be specified even by a user that does not have any knowledge regarding the key used for the encryption.

Specifically, in a case where it is required from a user to extract a tuple of greater (or smaller) numerical value than a given value having a specific property in operating a database system having table information (table) that is a set of tuples having various properties, it is possible for the database system side to assess the greater-than-and-less-than relation of the encrypted numerical values without knowing the key used for the encryption. Therefore, it is possible to respond to the request from the user.

Further, when it is possible to know the consistency regarding a specific number of character strings in the prefixes contained in the target cipher-text and another cipher-text in the tuples in which the numerical values are encrypted, the greater-than-and-less-than relation of the cipher-texts may not be assessed directly in some cases.

In such case, all the cipher-texts of the tuples to be the candidates for the consistent character strings of the prefixes contained in the cipher-texts need to be extracted from the table information, so that a desired numeric data cannot be extracted surely.

Further, the orders of the data are saved before and after the encryption in in the table information of the database, so that the greater-than-and-less-than relation of the numerical values of the plain texts may be conjectured from the cipher-texts.

As a known related technique for that, a method which encrypts numeric data stored in a database is known (Non-Patent Document 1). With the known related technique, when a given numerical value M as a plain text and a key K are given, a cipher-text C is generated as C=ENC (K, M) by using a given encryption function ENC.

Further, in this case, regarding two numbers M and M' (defined as arbitrary M>M'), ENC (K, M)>ENC (K, M') applies.

That is, when C=ENC (K, M) and C'=ENC (K, M') are given, it is possible to assess the greater-than-and-less-than relation of M and M' without decrypting C and C'.

Further, as a method for comparing the extent of the encrypted numerical values, there is known a method disclosed in Non-Patent Document 2.

The method disclosed in Non-Patent Document 2 is a kind of common key encryption with which: a document M (100) as a plain text expressed by being divided into a plurality of blocks as in M=(b[1], - - - ,b[N]) is encrypted to generate a cipher-text 101 that is constituted with a plurality of blocks as in C=(C[1], C[2], - - - ,C[n]). The content thereof is disclosed in FIG. 8 to FIG. 9.

In that case, when the first k-pieces in the two plain texts to be compared are the same, the first k-blocks of the cipher-texts thereof are also equivalent. Thus, partial consistency can be assessed while being remained in the state of cipher-texts. Therefore, when the first k-blocks are consistent in two plain texts regarding given k, it means that there are consistent prefixes therein or k-pieces of prefixes are consistent.

Further, referring to FIG. 8, when a key K105 as well as the document M 100 as a plain text is given as M=(b[1], - - - ,b[N]), an encryption formula for generating a cipher-text C is disclosed in Non-Patent Document 2. Note here that it is defined as C[0]=0.

Further, this related technique selects b[i] regarding i=1, 2, - - - ,N, uses the key K105 along with (i−1)-th block 107 of the cipher-text and recursively uses a deriving device 104 achieved by a hash function or the like to calculate the i-th block C[i] 106 of the cipher-text by using the hash function (Hash).

Here, it is defined as C[i]=Hash (K, (C[i−1], b[i])).

Further, the cipher-text C101 is defined as C=(C[1], - - - ,C[N]).

Further, when the first k-pieces of blocks of the cipher-text C are named as the prefix k blocks of C and expressed as C[k], it can be expressed as C[k]=(C[1], - - - ,C[k]).

Here, the orders of the cipher-texts are compared by using the encryption method.

Particularly, when it is desired to select all cipher-texts of smaller number than a given numerical value "a" without performing decryption from a set of a plurality of numbers of cipher-texts, a set of all the prefix k-blocks C[k] of the cipher-texts C in which the number smaller than "a" and the k-pieces of prefixes are consistent regarding a given k but the k-pieces of prefixes are not consistent with the number larger than "a" is defined as P(a).

Then, regarding the size of the set, when the party that holds the smaller number of key than "a" generates P(a) and gives it to the party that holds the set of the plurality of cipher-texts, the latter can select the smaller number of cipher-texts than "a" from the held set of cipher-texts without decrypting the cipher-texts.

Non-Patent Document 1: Alexandra Boldyreva, Nathan Chenette, Younho Lee, Adam O'Neill: Order-Preserving Symmetric Encryption, EUROCRYPT 2009: 224-241

Non-Patent Document 2: Georgios Amanatidis, Alexandra Boldyreva, Adam O'Neill: Provably-Secure Schemes for Basic Query Support in Outsourced Databases. DBSec 2007: 14-30

However, even when there is no request for the numeric data from a legitimate user, it is possible with the related technique disclosed in Non-Patent Document 1 described above to perform a greater-than-and-less-than comparison of the plain-text data without decoding the encrypted data.

Therefore, even when the numeric data in the database is properly encrypted, unlawful search processing for the numerical data may be performed and a specific numeric data in the database may be acquired. Thereby, the numeric data in the database may be leaked out.

Further, with Non-Patent Document 2 described above, it is possible to compare the cipher-texts without holding the key used for the encryption (i.e., without knowing the key for the encryption) based on the consistency between the prefixes of different cipher-texts. Thus, when it is used for the database, the numeric data having the consistent character strings of the prefixes may be leaked from the database.

It is therefore an object of the present invention to improve the inconveniences of the related techniques and to provide an encryption device, a cipher-text comparison system, a cipher-text comparison method, and a cipher-text comparison program capable of performing a greater-than-and-less-than assessment of the original numerical data while keeping the concealed property of the encrypted numeric data.

DISCLOSURE OF THE INVENTION

In order to achieve the foregoing object, the encryption device according to the present invention is characterized to include: a key calculation unit which calculates a derived key by a calculation using a first hash function set in advance by taking a plain text as a numerical value and an identifier corresponding thereto as input values; a cipher-text-by-identifier generation unit which generates a cipher-text-by-identifier acquired by encrypting the identifier by a calculation using the first hash function by taking the identifier and the derived key as input values; a relative value generation unit which generates relative values e, e' that are values used for a greater-than-and-less-than comparison assessment between the plain text and another plain text through performing a calculation using a second hash function set in advance by taking the derived key and the plain text as input values; a relative value cipher-text concealment unit 307 which generates a relative value cipher-text acquired by encrypting the relative value through a calculation using the second hash function by taking the derived key, the identifier, and the relative value as input values; and a cipher-text generating/outputting function 506A which generates and outputs a character string constituted with the cipher-text-by-identifier and the relative value cipher-text as a cipher-text of the plain text.

Further, in order to achieve the foregoing object, the cipher-text comparison system according to the present invention is characterized to include the encryption device described above and a comparison processing device which captures a first cipher-text and a second cipher-text generated by the encryption device by corresponding to each of different plain texts, wherein the comparison processing device includes: a relative value restoration unit which separately restores the relative values e, e' corresponding to each of the plain texts through performing calculations based on the second hash function by taking the identifiers and the derived keys set by corresponding to each of the first and second cipher-texts, respectively as input values; and a relative value comparison assessment unit which includes a greater-than-and-less-than comparison assessment function which performs a greater-than-and-less-than assessment on the different plain texts through performing a greater-than-and-less-than comparison on the relative values which correspond to the different plain texts, respectively.

Further, in order to achieve the foregoing object, the cipher-text comparison method according to the present invention is used in a cipher-text comparison system which includes an encryption device which encrypts each of a plurality of plain texts as different numerical values and a comparison processing device which captures a first cipher-text and a second cipher-text generated by the encryption device by corresponding to each of the different plain texts and performs greater-than-and-less-than comparison processing on both documents, and the cipher-text encryption method is characterized to include: calculating a derived key by a calculation using a first hash function set in advance by taking the plain text as the numerical value and an identifier corresponding thereto as input values; generating a cipher-text-by-identifier acquired by encrypting the identifier by a calculation using the first hash function by taking the identifier and the derived key as input values; generating relative values that are values used for a greater-than-and-less-than comparison assessment between the plain text and another plain text through performing a calculation using a second hash function set in advance by taking the derived key and the plain text as input values; generating a relative value cipher-text acquired by encrypting the relative value through a calculation using the second hash function by taking the derived key, the identifier, and the relative value as input values; and generating and outputting a character string constituted with the cipher-text-by-identifier and the relative value cipher-text as a cipher-text of the plain text, wherein contents of each of above-described steps are executed by the encryption device of the cipher-text comparison system; restoring the relative values corresponding, respectively, to the plain text and the another plain text through performing calculations by using the second hash function based on the identifiers and the derived keys of each of a first and a second cipher-texts when the second cipher-text generated by corresponding to the another plain text and the first cipher-text are received as input; and performing a greater-than-and-less-than assessment on the plain texts through performing a greater-than-and-less-than comparison on the relative values corresponding to the plain text and the another plain text, respectively, wherein each of those processing steps are executed by the comparison processing device of the cipher-text comparison system.

Further, the cipher-text comparison program according to the present invention is used in a cipher-text comparison system which includes an encryption device which encrypts each of a plurality of plain texts as different numerical values and a comparison processing device which captures a first cipher-text and a second cipher-text generated by the encryption device by corresponding to each of the different plain texts and performs greater-than-and-less-than comparison processing on both documents, and the cipher-text program is characterized to cause a computer provided to the encryption device to execute: a key calculating function which calculates a derived key by a calculation using a first hash function set in advance by taking a plain text as a numerical value and an identifier corresponding thereto as input values; a cipher-text-by-identifier generating function which generates a cipher-text-by-identifier acquired by encrypting the identifier by a calculation using the first hash function by taking the identifier and the derived key as input values; a relative value generating function which generates relative values that are values used for a greater-than-and-less-than comparison assessment between the plain text and another plain text through performing a calculation using a second hash function set in advance by taking the derived key and the plain text as input values; a relative value cipher-text generating function which generates a relative value cipher text acquired by encrypting the relative value by a calculation using the second hash function by taking the derived key, the identifier, and the relative value as input values; and a cipher-text generating function which generates each character string used for a greater-than-and-less-than comparison assessment regarding the plain text as well as the another plain text constituted with the cipher-text-by-identifier and the relative value cipher-text.

The present invention is structured and functions in the manner described above. By employing the structure that is provided with a module for generating relative values of the numerical data from the numerical data as a plain text and the key information and a module for restoring the relative values corresponding to each of the different cipher-texts, it becomes possible to provide the encryption device, the cipher-text comparison system, the cipher-text comparison method, and the cipher-text comparison program, which are capable of performing the greater-than-and-less-than comparison of the numeric data while maintaining the concealed property of the different numeric data that are the encrypted plain texts.

BEST MODES FOR CARRYING OUT THE INVENTION (Embodiment)

Next, an embodiment of a cipher-text comparison system according to the present invention will be described by referring to FIG. 1 to FIG. 7.

Basic structural contents of the embodiment will be described first, and specific contents will be described thereafter.

As shown in FIG. 1 to FIG. 4, the cipher-text comparison system according to the embodiment has the structure which includes: an encryption device (device A) which, when a document M (plain text) 502 as an encryption-target numeric data, an identifier ID503 that is set by corresponding to the document M502, and a master key 501 that is the master data key used when encrypting the document M502 are acquired as input items, generates a cipher-text C508 acquired by encrypting the document M502 based upon those; and a comparison processing device (device B) 514 which, when the cipher-text C508 sent from the encryption device 510 and another cipher-text C'512 set in advance are acquired, performs greater-than-and-less-than comparison processing between the document (M) 502 as the plain text of the cipher-text C508 and a document (N) as the plain text of a cipher-text 512.

Note here that the cipher-text C'512 is inputted from outside to the comparison processing device (device B) 514 along with the identifier ID'511 that is set in advance by corresponding to the cipher-text C'512.

Each of the device A510 and the device B514 includes a CPU (central processing unit), a main storage unit such as a semiconductor memory, and a storage device such as an HDD, and is a computer such as a server device or a terminal device which performs data processing by controlling the programs.

Further, the device B includes a display device for outputting and displaying assessment results of the greater-than-and-less-than comparison processing.

Note that the cipher-text comparison system may also be structured to achieve the execution contents of the device A and the device B by a single computer.

Figure 1:
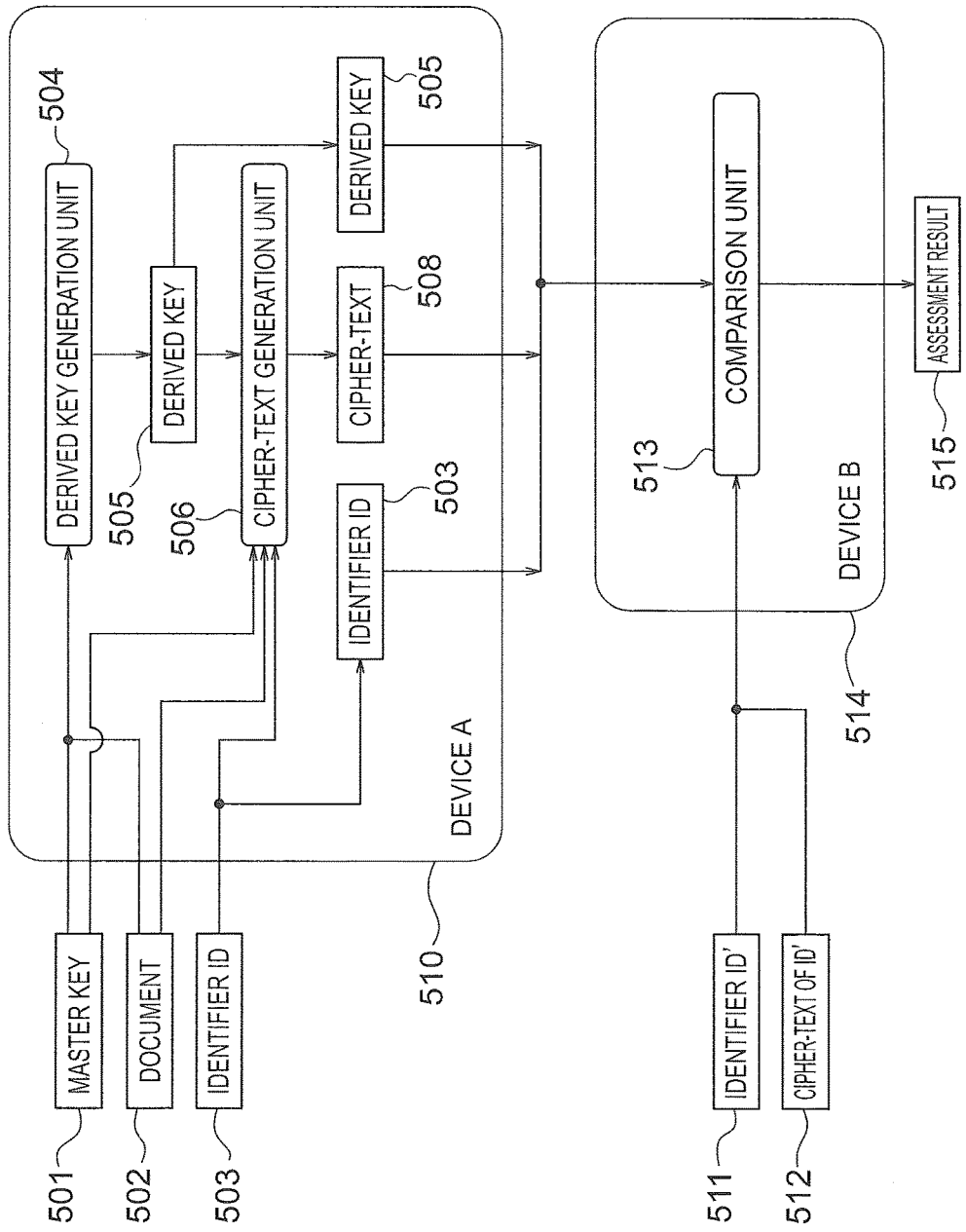
FIG. 1 is a block diagram showing an embodiment of a cipher-text comparison system according to the embodiment.

As shown in FIG. 1, the encryption device (device A) 510 includes: a derived key generation unit 504 which generates a derived key 505 based on the master key 501 and the document M502 inputted by the user; and a cipher-text generation unit 506 which generates the cipher-text 508 corresponding to the document M502 based on the master key 501, the document 502, the identifier ID503 inputted from outside by the user and the derived key 505 generated by the derived key generation unit 504.

Figure 3:
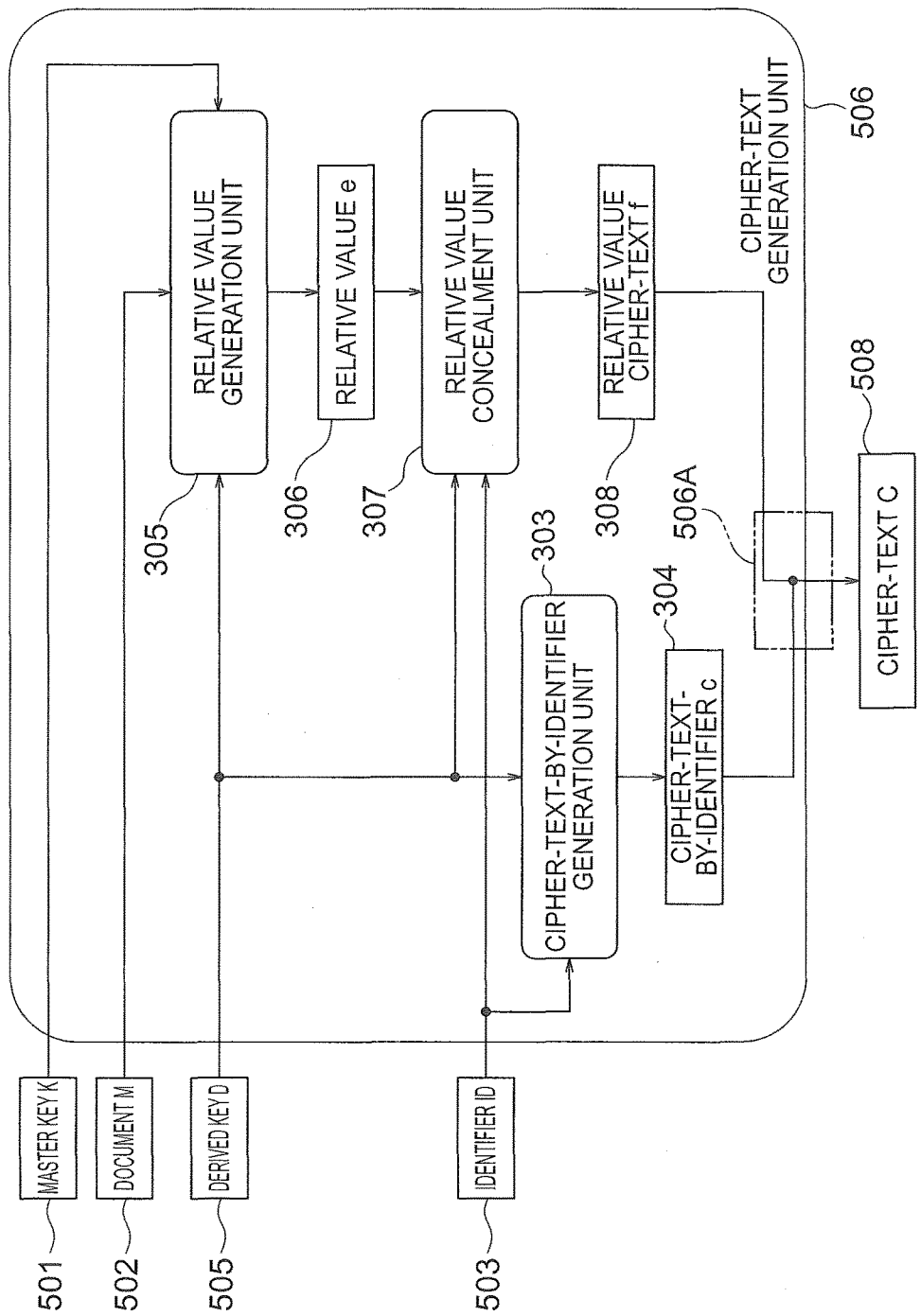
FIG. 3 is an explanatory chart showing operation contents of a cypher-text generating function of the encryption device (device A) of the cipher-text comparison system disclosed in FIG. 1.

As shown in FIG. 3, the cipher-text generation unit 506 of the device A510 includes: a cipher-text-by-identifier generation unit 303 which calculates a cipher-text-by-identifier c by performing a calculation using a first hash function (Hash) based on the input values; a relative value generation unit 305 which calculates a relative value e306 by performing a calculation using a second hash function (Hash3); a relative value concealment unit 307 which generates a relative value cipher-text f308 by performing encryption of the relative value e306 using the second hash function (Hash3); and a cipher-text generating/outputting unit 506A which generates and outputs a cipher-text C constituted with the calculated cipher-text-by-identifier c304 and relative value cipher-text C.

Note that a corresponding identifier ID is allotted to each of the documents (e.g., document M) inputted to the device A510. Hereinafter, a pair of the identifier ID and the document M will be written as (ID, M).

Hereinafter, this will be described in details.

The derived key generation unit 504 of the encryption device (device A) performs binary expansion of the inputted document M. Thereby, the document M can be expressed by a form of (Expression 1) shown below.

$$M = \Sigma i=1n b[i] 2i \quad \text{(Expression 1)}$$

Note that "n" in (Expression 1) shows the bit length of the document M.

It is defined here that b[i] in (Expression 1) satisfies b[i]∈{0, 1}. Further, the document M is defined as M=(b[1], b[2], - - - ,b[n]).

Next, the inside structure of the encryption device (device A) 510 will be described.

It is to be understood that the first hash function (Hash) and the second hash function (Hash3) as the hash functions set in advance (not shown) are stored in the device A510. Note here that Hash and Hash3 can be expressed as following Expressions 2 and 3 by taking k as a safety variable, respectively.

$$\text{Hash}: \{0, 1\}^k \times \{0, 1\}^* \rightarrow \{0, 1\}^k \quad \text{(Expression 2)}$$

$$\text{Hash3}: \{0, 1\}^k \times \{0, 1\}^* \rightarrow \{0, 1, 2\} \quad \text{(Expression 3)}$$

Note here that K∈{0, 1}$^k$ is taken as the master key.

(Derived Key Generating Function)

Here, the function (derived key generating function) of the derived key generation unit 504 of the encryption device (device A) 510 for generating the derived key D505 will be described by referring to FIG. 2.

Figure 2:
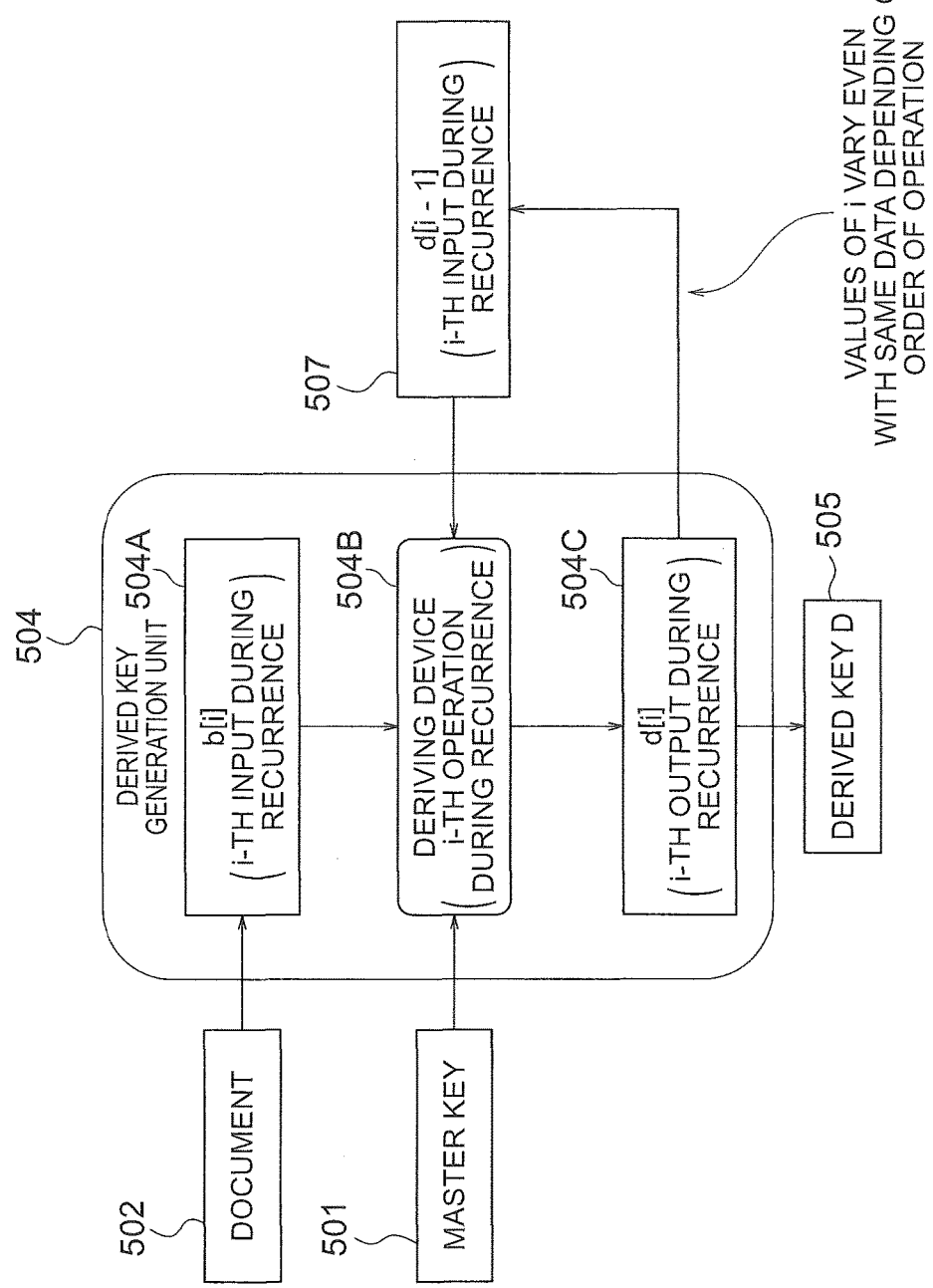
FIG. 2 is an explanatory chart showing operation contents of a derived key generating function of an encryption device (device A) of the cipher-text comparison system disclosed in FIG. 1.

FIG. 2 shows a case where the master key K501 and the document M502 are sent to the derived key generation unit 504 as input values.

At this time, it is to be noted that the document M502 is expressed as M=(b[1], b[2], - - - ,b[n]).

Further, the derived key D is expressed as D=(d[1], d[2], - - - ,d[n]).

The derived key generation unit 504 calculates d[0] by using the first hash function (Hash) described above. Note here that d[0]=Hash(K, 0).

Further, the derived key generation unit 504 includes: a b[i] selection unit 504A which selects b[i] in an ascending order as 1, 2, regarding the counter i=1, 2, - - - ,n (i is the target counter); a block value deriving function 504A which acquires the value of the (i−1)-th block contained in the prefix block of the already-calculated derived key D and the master key K501 (FIG. 2), and calculates the value of the i-th block of the derived key by performing a calculation (shown in Expression 4 in the followings) using the hash function based thereupon; and a derived key outputting function 504C which outputs it as the derived key D.

$$d[i] = \text{Hash}[K, (d[i-1], b[i])] \quad \text{(Expression 4)}$$

The derived key generation unit 504 outputs the generated derived key D when the target counter reaches the value equivalent to the bit length n of the document M502 (n=i).

In that case, when the value of the target counter i is smaller than the bit length n of the document M502 (i<n), the derived key generation unit 504 acquires the value 507 of the d[i−1] from a derived key buffer (not shown) stored on a memory as the input value, and derives the value of the target counter based on the (Expression 4) described above (a deriving function: the i-th operation in recurrence/the derived key outputting function 504C).

Through executing it recursively from the 1st to i-th times to calculate the i-th block d[i] constituting the derived key, respectively, so as to generate the derived key D.

(Cipher-text Generating Function)

Next, the function (cipher-text generating function) of the cipher-text generation unit 506 of the encryption device 510 executed for generating the cipher-text C508 when the master key D501, the document M502, and the derived key D505 are given as the input values will be described by referring to FIG. 3.

Note here that the derived key D505 and the document M502 are defined as follows, respectively.

$$\text{Derived key } D505 = (d[1], d[2], \text{- - -}, d[n])$$

$$\text{Document } M502 = (b[1], b[2], \text{- - -}, b[n])$$

The cipher-text generation unit 506 constitutes the main part of the encryption device 510. As shown in FIG. 3, the cipher-text generation unit 506 includes: the cipher-text-by-identifier generation unit 303 which generates an encrypted identifier (cipher-text-by-identifier) c; the relative value generation unit 305 which generates a relative value e that is a value used for performing a greater-than-and-less-than comparison assessment between a plain text and another plain text; the relative value concealment unit 307 which calculates a relative value cipher-text f corresponding to each of the counter values from 1 to n based on the generated relative value e; and the cipher-text generating/outputting function 506A which generates a character string constituted with the cipher-text-by-identifier c and the relative value cipher-text f as a cipher-text for the plain text.

Among those, the cipher-text-by-identifier generation unit 303 calculates the cipher-text-by-identifier c304 through performing a calculation using the first hash function (Hash) based on the identifier ID (corresponding to the identifier ID503 of FIG. 1) and the derived key D given as the input values.

Note here that c[i] constituting the cipher-text-by-identifier c304 is expressed as c[i]=Hash (ID, d[i]) regarding the counter value i=1, 2, - - - ,n.

Further, the relative value generation unit 305 calculates the relative value e306 by performing a calculation using the second hash function (Hash3) based on the master key K501, the document M502, and the derived key D505 given as the input values.

Note here that e[i] constituting the relative value e306 is expressed as e[i]=Hash3 (0, K, d[i−1])+b[i] mod3 regarding the counter value i=1, 2, - - - ,n.

Further, the relative value concealment unit 307 calculates the relative value cipher-text f308 constituted with f[i] corresponding to each of the counter values from 1 to n by performing a calculation (Expression 6) using the second hash function (Hash3) based on the inputted identifier ID as well as the derived key D, and the relative value e306 generated by the relative value generation unit 305.

It is to be noted here that the derived key D is generated by corresponding to the identifier ID. Further, f[i] constituting the relative value cipher-text f is expressed as follows regarding the counter value i=1, 2, - - - ,n.

$$f[i] = \text{Hash3}(1, ID, d[i-1]) + e[i] \bmod 3 \quad \text{(Expression 6)}$$

Further, the cipher-text generation unit 506 generates the cipher-text C508 which is constituted with the cipher-text-by-identifier c304 and the relative value cipher-text f308 calculated by corresponding to each of the counter values i=1, 2, - - - ,n.

Note here that the cipher-text C508 is expressed as follows.

$$C=[(c[1], c[2], c[n]), (f[1], f[2], ---f[n])]$$

Next, the inside structure of the comparison processing device (device B) 514 will be described. As shown in FIG. 1, the comparison processing device (device B) 514 includes a comparison unit 513 which acquires the cipher-text C508, the identifier ID503, and the derived key D505 inputted from the encryption device A510, and performs a greater-than-and-less-than comparison of the plain texts corresponding to the cipher-text C508 and the cipher-text (referred to as C') of the ID' inputted in advance.

Figure 4:
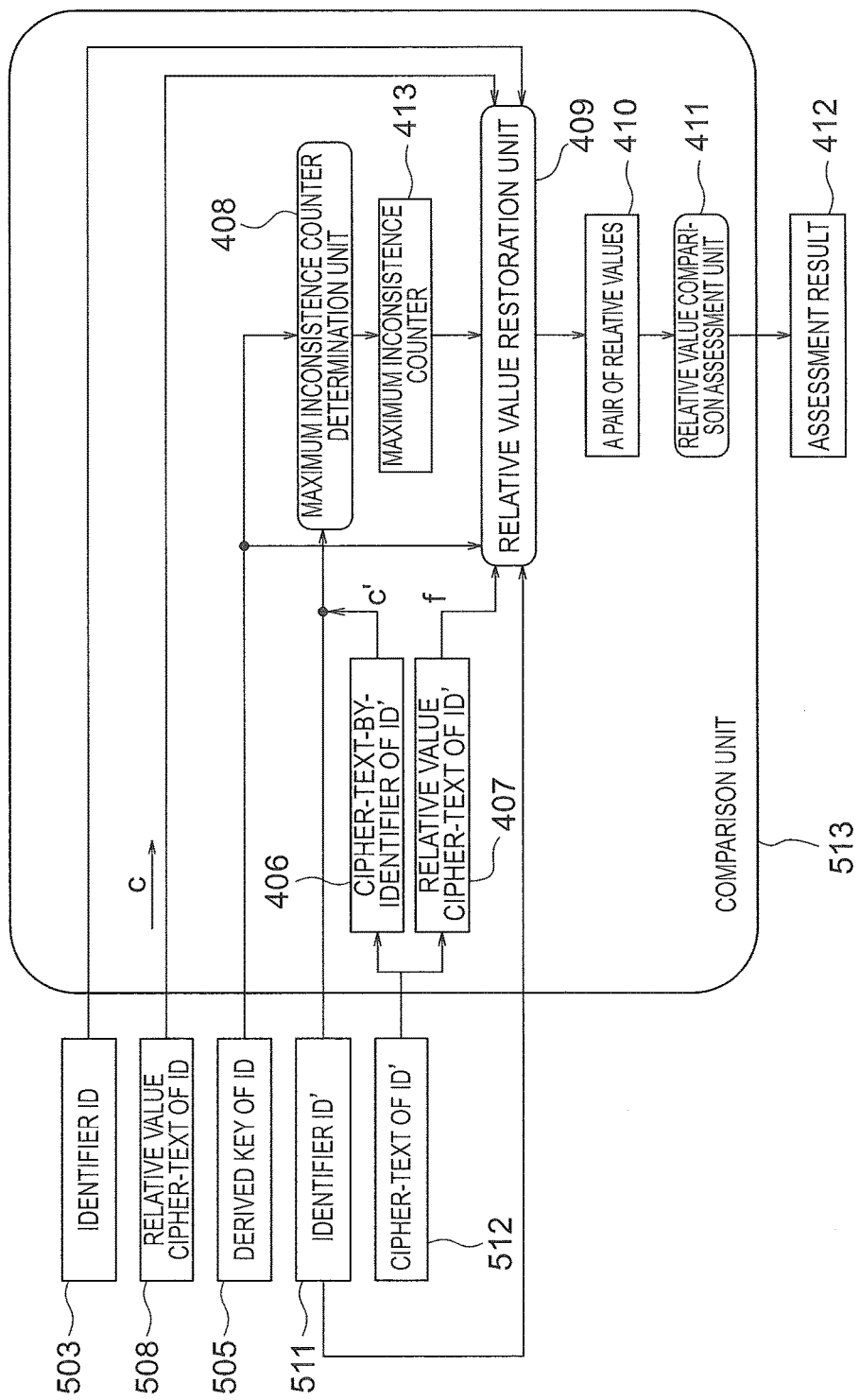
FIG. 4 is an explanatory chart showing operation contents of a comparison assessment unit of a comparison processing device (device B) of the cipher-text comparison system disclosed in FIG. 1.

As shown in FIG. 4, the comparison unit 513 includes: a maximum inconsistence counter determination unit 408 which specifies the counter at which the value different from the counter value generated based on the derived key D403 that is generated and constituted based on the identifier ID511' as the identifier corresponding to the cipher-text C' and the identifier ID503 appears first on the counter value of the cipher-text-by-identifier c' corresponding to the document N; a relative value restoration unit 419 which restores the relative values e and e' corresponding to the cipher-texts C and C', respectively, based on the values of the specified counters; and a relative value comparison unit 411 which performs a greater-than-and-less-than comparison of the restored relative values e and e'.

(Comparison Assessment Function)

Next, the function (comparison assessment function) of the comparison unit 513 of the device B514 for performing a greater-than-and-less-than comparison assessment of the original document M and the document N corresponding to the cipher-texts C and C', respectively, based on the different cipher-texts (the cipher-text C508 and the cipher-text C'512) received as the input will be described by referring to FIG. 4.

FIG. 4 shows that the identifier ID503 corresponding to the document M, the relative value cipher-text f generated by corresponding to the identifier ID, and the derived key D505 generated by corresponding to the identifier ID503 are inputted to the comparison unit 513.

The identifier ID503, the relative value cipher-text f, and the derived key D505 may also be those sent from the device A (encryption device) as the identifier ID503 (FIG. 1), the relative value cipher-text (FIG. 2), and the derived key D505 (FIG. 1), respectively.

Further, as shown in FIG. 4, the cipher-text C'512 as the comparison target of the cipher-text C508 and the identifier ID503 that is the identifier of the cipher-text C'512 are inputted to the comparison unit 513.

Note here that the relative value cipher-text f inputted to the comparison unit 513 is expressed as f=(f[1], f[2], ---,f[n]), the derived key D corresponding to the identifier ID (and the cipher-text C) is expressed as D=(d[1], d[2], ---,d[n]), and the cipher-text (i.e., the cipher-text C') of the ID' is expressed as C'=[(c'[1], c'[2], ---,c'[n]), (f'[1], f'[2], ---,f'[n])].

Further, the comparison unit 513 analyzes the cipher-text (cipher-text C') of the inputted ID', and extracts the cipher-text separately as the cipher-text-by-identifier c' of the ID' and the relative value cipher-text f' of the ID'.

Note here that the cipher-text-by-identifier c' of the cipher-text C' is defined as c'=(c'[1], c'[2], , c'[n]), and the relative value cipher-text f' is defined as f'=(f'[1], f'[2], ---,f'[n]).

When the derived key D and the identifier ID' are acquired as the input values, the maximum inconsistence counter determination unit 408 performs a calculation Hash (ID', d[k]) by using the hash function (Hash) regarding counter k in an ascending order from 1 to n based on the derived key D [=(d[1], d[2], ---,d[n])] and the identifier ID'.

Note here that the maximum inconsistence counter determination unit 408 assesses whether or not the values calculated regarding the counter k for each of the values 1 to n and the cipher-text-by-identifier c' (corresponding to the cipher-text C') of the ID' are equivalent or not for each counter k. The identifier ID' may be set in advance within the device B.

Specifically, the maximum inconsistence counter determination unit 408 assesses whether or not the equality of (Expression 8) shown below applies regarding each of the counters from 1 to n (counter k).

$$c'[k]=\text{Hash}(ID', d[k]) \quad \text{(Expression 8)}$$

Note here that the maximum inconsistence counter determination unit 408 assesses whether or not the equality of Expression 8 applies in an ascending order from the counter i=1, and determines the first counter value at which the equality (Expression 8) becomes unsatisfied as the maximum inconsistence counter j413 (FIG. 4).

Further, the relative value restoration unit 409 assesses whether or not (Expression 10) or (Expression 11) of the relative value cipher-texts f, f' shown below applies based on the identifiers ID, ID', the derived key D, and the relative value cipher-texts e, e', respectively. It is defined as e, e'∈{0, 1, 2}.

$$f[j]=\text{Hash3}(1, ID, d[j-1])+e \bmod 3 \quad \text{(Expression 10)}$$

$$f'[j]=\text{Hash3}(1, ID', d[j-1])+e' \bmod 3 \quad \text{(Expression 11)}$$

Note here that the relative value restoration unit 409 generates a relative value pair 410 constituted with e and e' which satisfy (Expression 10) or (Expression 11) mentioned above.

The relative value comparison unit 411 acquires a relative value pair (a pair of e and e') from the relative value restoration unit 409. When e-e'=1 mod3 applies for the relative value pair, the relative value comparison unit 411 assesses that the document M of the identifier ID is greater than the document N of the identifier ID', and outputs the value (e.g., 0) as a symbol for showing "document M>document N" as an assessment result 412.

Further, when e-e'=2 mod3 applies for the relative value pair acquired from the relative value restoration unit 409, the relative value comparison unit 411 assesses that the document N of the identifier ID' is greater than the document M of the identifier ID, and outputs the value (e.g., 1) as a symbol for showing "document N>document M" as an assessment result.

As described above, the embodiment makes it possible to effectively suppress the greater-than-and-less-than assessment regarding the plain texts corresponding to each of the cipher-texts from the character strings contained in the cipher-texts regarding a plurality of different encrypted cipher-texts.

Therefore, it is possible to effectively suppress the third party that has no knowledge regarding the key of the cipher-texts to find out the greater-than-and-less-than relation of the numeric data as the plain texts.

Even in a case where two cipher-texts corresponding to a same plain text (document) or corresponding to plain texts whose prefix parts are consistent are given, for example, the cipher-text generating function of the embodiment can perform encryption in such a manner that the consistency between the both plain texts or consistency between the prefixes of the plain texts cannot be assessed since the encryption is done by using the different identifiers even though the prefixes of the respective derived keys are consistent. It is noted that, as shown in Expression 1 and the definition of the document M where "M=(b[1], b[2], b[n])" in the Specification of the present invention, a notation in which the most significant bit in a sequence is farthest to the right is adopted; and "prefix" means the sequence read from the right-most bit.

Further, in a case where a given cipher-text (C) and a derived key corresponding to the cipher-text are given, the restoration assessing function of the device B can assess whether or not the prefixes of the plain texts corresponding to the other cipher-text (C') and the cipher-text (C) are consistent.

Furthermore, in a case where cipher-texts of two plain texts whose character strings of the prefixes are consistent up to the k-pieces of counters and the derived keys corresponding thereto, respectively, are given, b[i] as the binary expansion elements of the documents (plain texts) are consistent for the counters i after k so that e[i], d[i], and f[i] are consistent as well. On the other hand, f[k+1] are not consistent, so that it is possible to perform a greater-than-and-less-than assessment regarding the both from the values of two f[k+1].

In a case where the two f[i] are not consistent, two b[i] can be determined from those values. In a case where f[i] are consistent, b[i] cannot be determined therefrom. That is, it is possible to specify the inconsistency and the greater-than-and-less-than relation of the k-th blocks in each of the cipher-texts of the two plain texts whose prefixes are consistent at k, i.e., it is possible to specify the values thereof. In that case, the values in the k-th block and thereafter can be concealed effectively.

(Explanations regarding Operations of Embodiment)

Next, the entire operations executed when there is a request for a greater-than-and-less-than comparison of the encrypted documents made to the cipher-text comparison system that is the embodiment will be described.

First, the derived key generation unit 504 of the encryption device (device A) 510 upon receiving a request from the user calculates the derived key D by a calculation using the hash function by having the documents (plain texts) as the numeric data and the identifiers ID corresponding thereto as the input (a derived key calculating step), and generates the cipher-text-by-identifier corresponding to the identifier ID by a calculation using the hash function by having the identifier ID and the derived key D as the input (a cipher-text-by-identifier generating step).

Further, the cipher-text generation unit 506 generates the relative values as the values used for performing a greater-than-and-less-than comparison assessment between the document and another document by performing a calculation using the second hash function by having the inputted derived keys and the documents as the inputs (a relative value generating step). Then, the relative value concealment device 307 of the cipher-text generation unit 506 generates the relative value cipher-texts acquired by encrypting the relative values through performing a calculation using the second hash function by having the derived keys, the identifiers, and the relative values as the input values (a relative value cipher-text generating step), and generates cipher-texts of the documents containing the cipher-text-by-identifier and the relative value cipher-text (a cipher-text generating step).

Then, the comparison unit 514 restores the relative values corresponding to the document C and the document C', respectively, by performing a calculation using the second hash function based on the respective identifiers and derived keys of the first and second cipher-texts for the second cipher-text generated by corresponding to the other cipher-text C' and the first and second cipher-texts (a relative value restoration processing step).

Then, the comparison unit 513 performs a greater-than-and-less-than assessment regarding the documents C and C' through performing a greater-than-and-less-than comparison of the relative values corresponding to the plain text and the other plain text, respectively (a greater-than-and-less-than comparison assessment processing step).

Note here that execution contents of the cipher-text-by-identifier generating step, the relative value generating step, the relative value cipher-text generating step, the cipher-text generating step, the relative value restoration processing step, and the greater-than-and-less-than processing step may be put into programs to be executed by a computer.

Further, the program may be recorded on a non-transitory recording medium such as a DVD, a CD, a flash memory, or the like. In that case, the program is read out from the recording medium and executed by a computer.

(Derived Key Generation Phase)

Next, operation steps for generating the derived key D by using the hash function will be described by referring to the flowchart of FIG. 5.

First, when the master key K501 and the document M502 are given as the input values, the derived key generation unit 504 calculates d[0] by using the hash function (Hash) and specifies it as the value of the prefix block set on the memory. Here, it is defined as d[0]=Hash (K, 0) (FIG. 5: step S51/i=0).

Note that the document M is expressed as M=(b[1], b[2], - - - ,b[n]). Further, the derived key D is expressed as D=(d[1], d[2], - - - ,d[n]).

Figure 5:
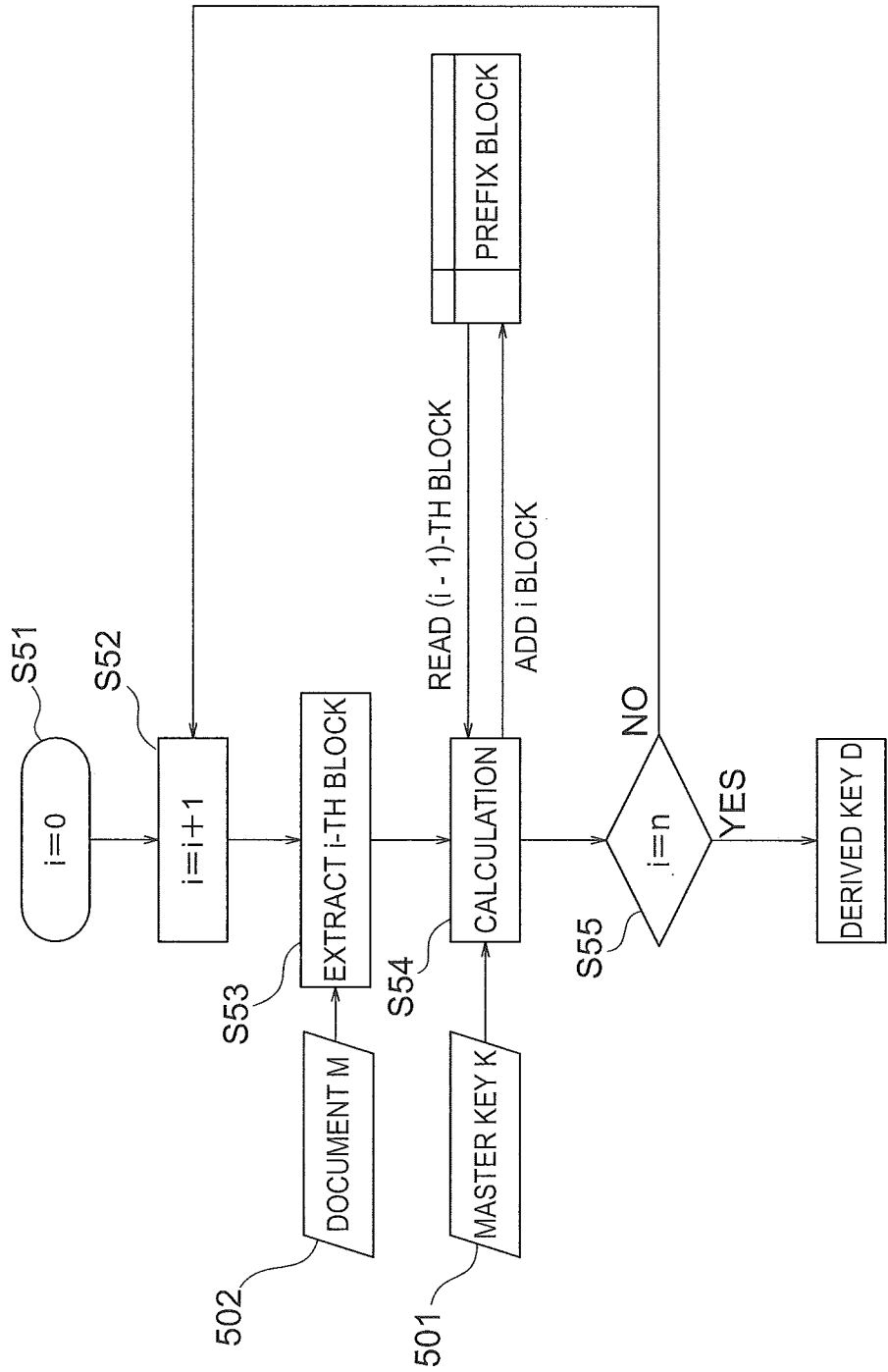
FIG. 5 is a flowchart showing operation processing steps for generating a derived key in the cipher-text comparison system disclosed in FIG. 1.

Then, the derived key generation unit 504 extracts the value of b[i] in an ascending order for each of the counters i=1, 2, - - - ,n of the document M (FIG. 5: step S52/i=i+1). Note here that the derived key generation unit 504 reads the value of the (i−1)-th block from the prefix blocks set on the memory regarding the value of the i-th block (FIG. 5: step S53) and, based on the value and the master key K501, calculates the value of the i-th block of the derived key K501 through performing a calculation (Expression 4 shown below) using the hash function (FIG. 5: step S54/i-th block calculation).

Here, the derived key generation unit 504 stores the calculated value of the i-th block to the prefix block (add i-th block).

$$d[i] = \text{Hash}(K, (d[i-1], b[i]))$$ (Expression 4)

Then, the derived key generation unit 504 assesses whether or not the bit length n of the document M and the target block i are consistent. When assessed as inconsistent (FIG. 5: step S55/No), the derived key generation unit 504 performs, by having i+1 as the target block (FIG. 5: step S52), processing for recursively setting each block that constitutes the derived key (FIG. 5: steps S53 to 55).

In the meantime, when assessed that the bit length n of the document M and the target block i are consistent (FIG. 5: step S55/Yes), the derived key D is generated.

(Cipher-text Generation Phase)

Next, the operations of the cipher-text generation unit 506 of the encryption device (device A) of the embodiment executed for generating the cipher-text C508 acquired by encrypting the document M502 will be described by referring to the block diagram of FIG. 1 and the flowchart of FIG. 6.

Note here that the derived key D505 and the document M502 are expressed as follows, respectively.

Derived key $D=(d[1], d[2], ---, d[n])$

Document $M=(b[1], b[2], ---, b[n])$

Figure 6:
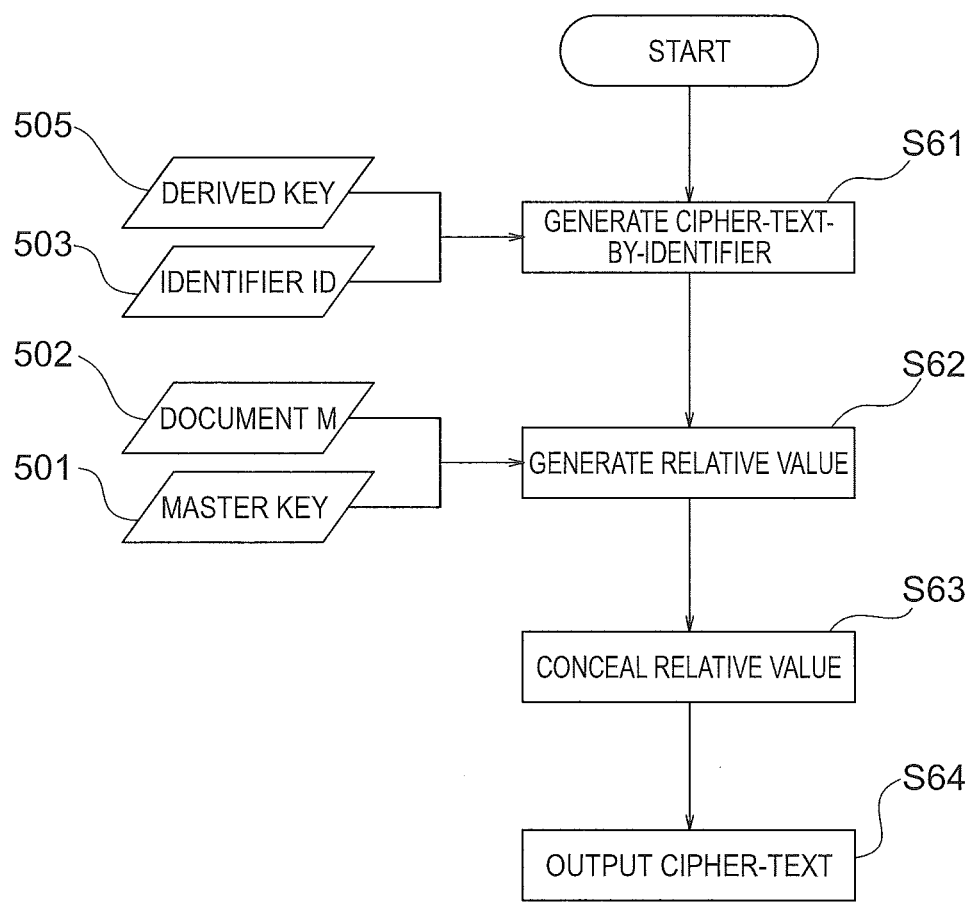
FIG. 6 is a flowchart showing operation processing steps for generating a cipher-text in the cipher-text comparison system disclosed in FIG. 1.

First, the cipher-text-by-identifier generation unit 303 of the cipher-text generation unit 506 calculates the cipher-text-by-identifier c by performing a calculation using the hash function (Hash) based on the identifier ID503 and the derived key D505 given as the input values (FIG. 6: step S61).

Note here that each element c[i] constituting the cipher-text-by-identifier c is expressed as c[i]=Hash (ID, d[i]) regarding the counter i=1, 2, ---, n.

Then, the relative value generation unit 305 calculates the relative value e (corresponding to FIG. 3) by performing a calculation using the second hash function (Hash3) based on the master key K501, the document M502, and the derived key D505 given as the input values (FIG. 6: step S62).

Note here that e[i] constituting the relative value 306 is expressed as e[i]=Hash3 (0, K, d[i−1]+b[i] mod3 regarding the counter i=1, 2, ---, n.

Then, the relative value concealment unit 307 calculates the relative value cipher-text f308 (FIG. 3) constituted with f[i] corresponding to the counter values from 1 to n, respectively, by performing a calculation (FIG. 6) using the second hash function (Hash3) based on the inputted identifier ID503 as well as the derived key D505 and the relative value e306 generated by the relative value generation unit 305 (FIG. 6: step S63).

It is to be noted that f[i] constituting the relative value cipher-text f308 is expressed as follows regarding the counter i=1, 2, ---, n.

$f[i]$=Hash3 (1, ID, $d[i-1]+e[i]$) mod3     (Expression 6)

Further, the cipher-text generation unit 506 generates the cipher-text C that is constituted with the cipher-text-by-identifier c304 and the relative value cipher-text f308 calculated by corresponding to the counter values i=1, 2, ---, n, respectively.

Note that the cipher-text C508 is expressed as C=[(c[1], c[2], ---, c[n]), (f[1], f[2], ---, f[n])].

In the cipher-text generation phase, even in a case where two cipher-texts corresponding to a same plain text (document) or plain texts (documents) whose prefix parts are consistent are given, for example, it is possible to perform encryption in such a manner that the consistency between the both plain texts or consistency between the prefixes of the plain texts cannot be assessed since the encryption is done by using the different identifiers even though the prefixes of the respective derived keys are consistent.

(Comparison Assessment Phase)

Next, the operations of the comparison processing device (device B) 514 according to the embodiment executed for performing a greater-than-and-less-than comparison of the document M and the document N based on the cipher-texts C and C' will be described by referring to the flowchart of FIG. 7.

First, the identifier ID503, the relative value cipher-text f308 generated by corresponding to the identifier ID503, and the derived key D505 generated by corresponding to the identifier ID503 are inputted to the comparison unit 513 of the comparison processing device (device B) 514.

Figure 7:
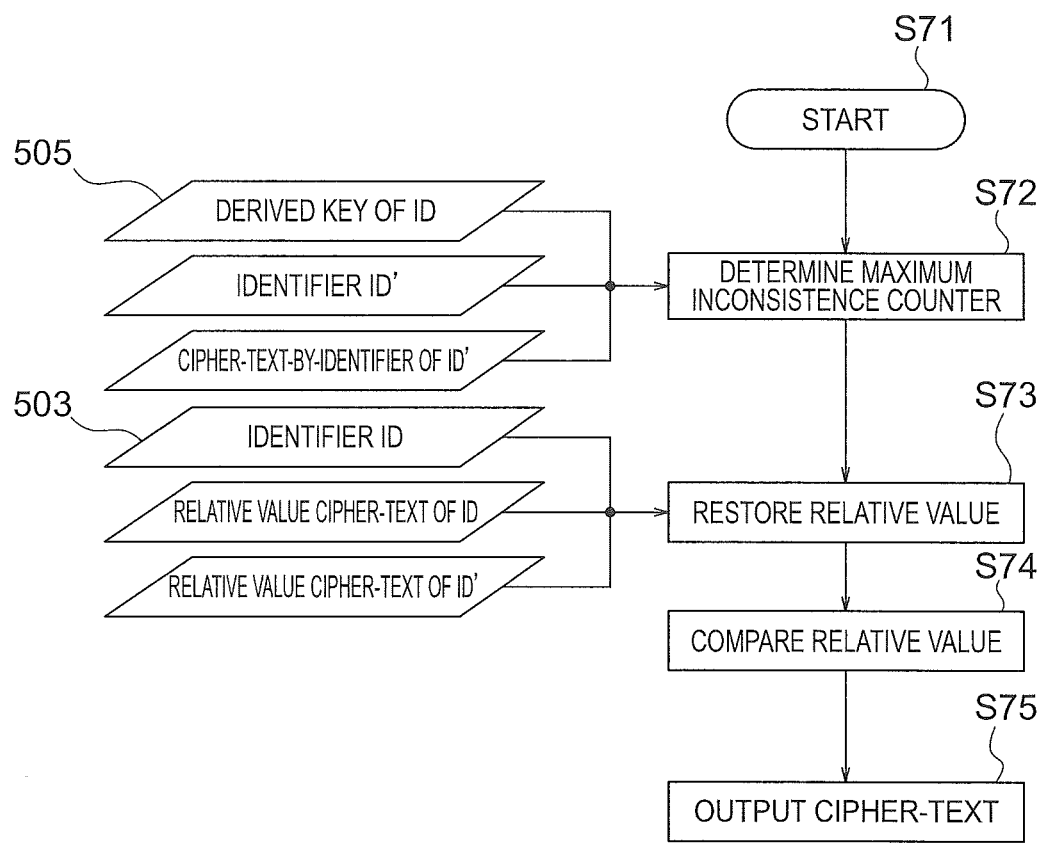
FIG. 7 is a flowchart showing operation processing steps for restoring and comparing the relative values in the cipher-text comparison system disclosed in FIG. 1.
Figure 8:
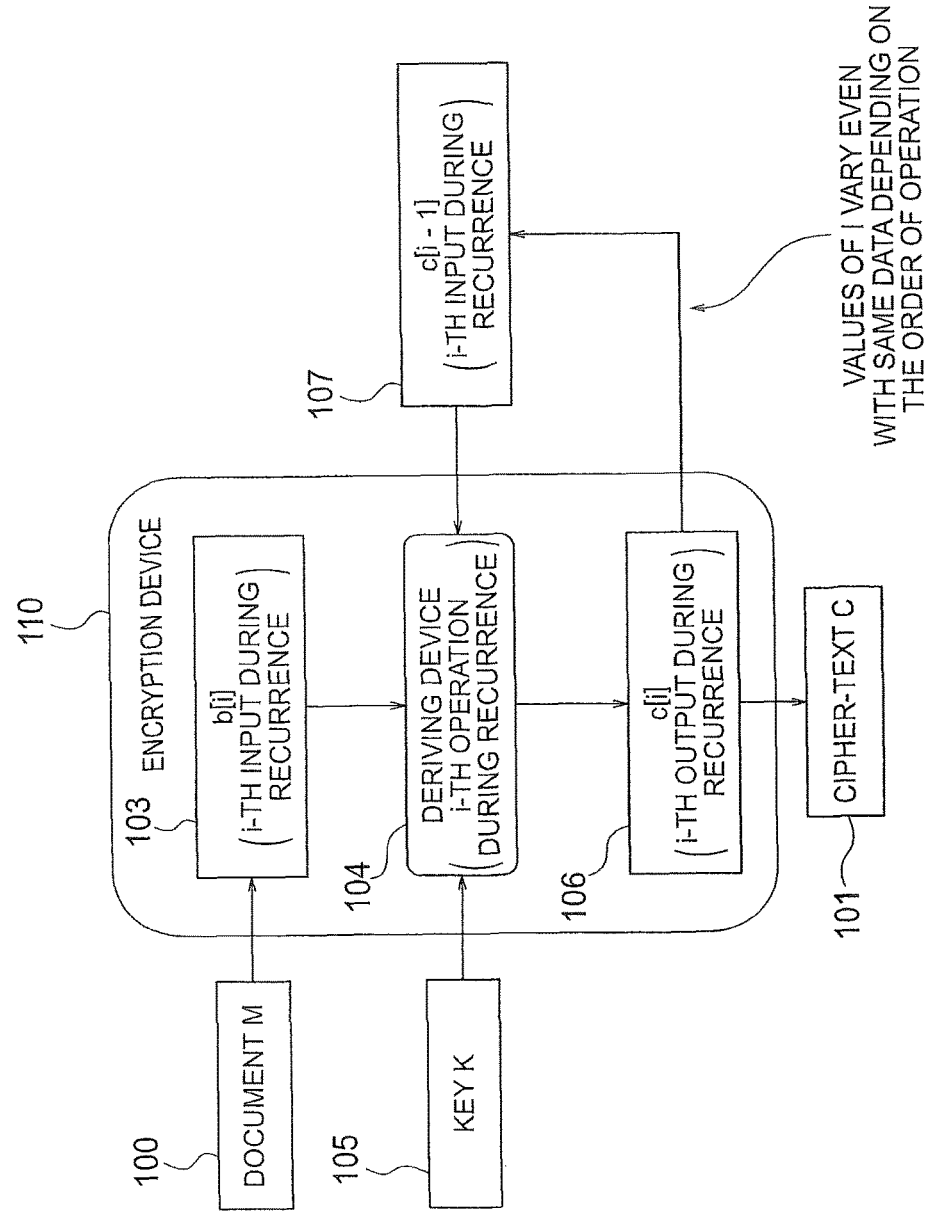
FIG. 8 is a block diagram for performing cipher-text generating processing of a known related technique of the cipher-text comparison system disclosed in FIG. 1.
Figure 9:
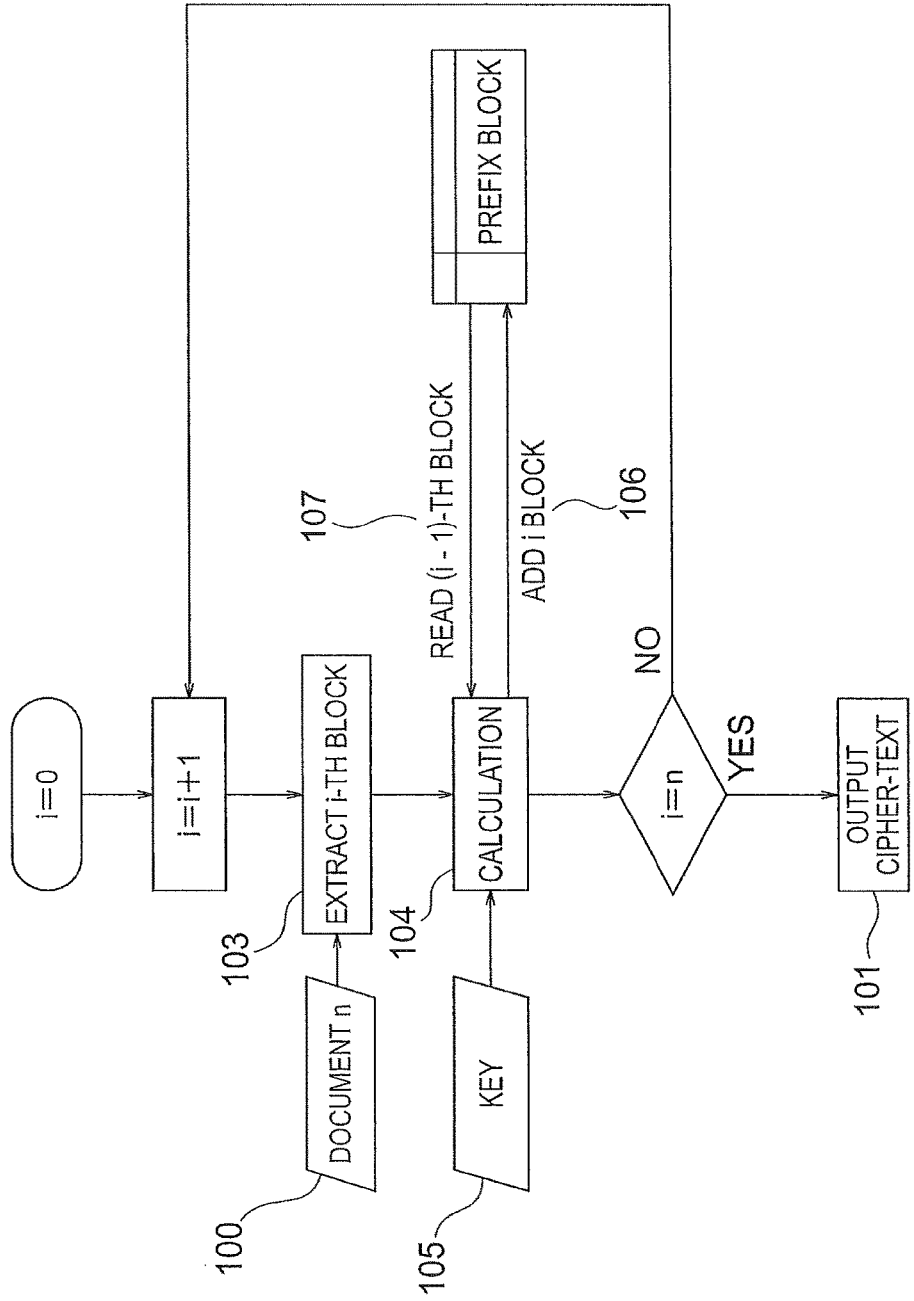
FIG. 9 is a flowchart showing operation contents for generating a cipher-text with the known related technique of the cipher-text comparison system disclosed in FIG. 1.

Further, it is to be noted that the cipher-text C' as the comparison target of the cipher-text C is set in advance in the comparison unit 513, and the identifier ID' that is the identifier of the cipher-text C' and the cipher-text C' (cipher-text of the ID') corresponding to the identifier ID'511 are inputted to the comparison unit 513 (FIG. 7: step S71).

Note that the relative value cipher-text f is expressed as f=(f[1], f[2], ---, f[n]). The derived key D505 corresponding to the identifier ID (and the cipher-text C) is expressed as D=(d[1], d[2], ---, d[n]), and the cipher-text (cipher-text C') of the ID' is expressed as C'=[(c'[1], c'[2], , c'[n]), (f'[1], f'[2], ---, r[n])].

The comparison unit 513 analyzes the cipher-text (cipher-text C') of the inputted ID' and extracts the cipher-text-by-identifier c' of the ID' and the relative value cipher-text f' of the ID' separately from the cipher-text C' (FIG. 7: step S71). It is to be noted that the cipher-text-by-identifier c' of the cipher-text C' is expressed as c' =(c'[1], c'[2], ---, c'[n]), and the relative value cipher-text f' is expressed as f'=(f'[1], f'[2], , f'[n]).

Then, when the derived key D505 and the identifier ID'511 are acquired as the input values, the maximum inconsistence counter determination unit 408 (FIG. 4) performs a calculation (Hash (ID', d[k]) by using the hash function (Hash) in an ascending order from 1 to n regarding the counter k based on the derived key D and the identifier ID'.

Here, the maximum inconsistence counter determination unit 408 assesses whether or not the values calculated, respectively, from 1 to n regarding the counter k and the cipher-text-by-identifier c of the ID' are equivalent. The identifier ID' may be set in advance within the device B.

Specifically, the maximum inconsistence counter determination unit 408 assesses whether or not the equality of (Expression 8) shown below applies for each of the counters from 1 to n (counter k).

$c'[k]$=Hash $(ID', d[k])$     (Expression 8)

Here, the maximum inconsistence counter determination unit 408 assesses whether or not the equality applies in an ascending order from the counter 1, and determines the counter value k with which the equality (Expression 8) becomes unsatisfied first as the maximum inconsistence counter j (413: FIG. 4) (FIG. 7: step 72).

Then, the relative value restoration unit 409 assesses whether or not (Expression 10) or (Expression 11) shown below applies based on the identifiers ID, ID', the derived key D, and the relative value cipher-texts f, f' respectively, and restores the relative values e, e' based thereupon.

It is to be noted that e, e'∈{0, 1, 2}.

$f[j]$=Hash3 (1, ID, $d[j-1]$)+e mod3     (Expression 10)

$f'[j]$=Hash3 (1, ID', $d[j-1]$)+e' mod3     (Expression 11)

Note here that the relative value restoration unit 409 generates a pair of relative values e, e' constituted with the relative values e and e' which satisfy (Expression 10) or (Expression 11) mentioned above (FIG. 7: step S73).

The relative value comparison unit 411 acquires the relative value pair (the pair of e and e') from the relative value restoration unit 409 and compares those values (FIG. 7: step S74).

When e−e'=1 mod3 applies for the relative value pair, the relative value comparison unit 411 assesses that the document M of the identifier ID is greater than the document N of the identifier ID', and outputs the value (e.g., 0) as a symbol for showing "document M>document N" as an assessment result (FIG. 7: step S75).

Further, when e−e'=2 mod3 applies for the relative value pair acquired from the relative value restoration unit 409, the relative value comparison unit 411 assesses that the document N of the identifier ID' is larger than the document M of the identifier ID, and outputs the value (e.g., 1) as a symbol for showing "document N>document M" as an assessment result 412 (FIG. 7: step S75).

As described above, the embodiment makes it possible to suppress a greater-than-and-less-than comparison of the original numerical data assessed only from the cipher-texts when the cipher-texts that are the encryption of the numeric data are given and to perform a larger-than-and-smaller comparison of the original numerical data from the character strings contained in the different encrypted cipher-texts when there is a request for performing a greater-than-and-less-than comparison of the numeric data corresponding to cipher-texts of given numerical values from a legitimate user made to the database.

Therefore, with the database system of the embodiment, the user of the database can acquire the numeric data that is greater (or smaller) than a specific encrypted numerical value contained in the database without having the numeric data before being encrypted known to the administrator and the like.

Further, the embodiment makes it possible to effectively suppress the third parties who do not know the key used for encryption to find out the plain text corresponding to the cipher-text based on the consistency in the character strings of the prefixes, even when the character strings (e.g., the prefix character strings) contained in two cipher-texts are consistent.

Therefore, it is possible to suppress the third parties who do not know the encryption key, for example, to extract and acquire a specific numeric data by using the greater-than-and-less-than relation between the numerical data constituting the database and the encrypted numerical data within the database. Thereby, the security of the data contained in the database can be enhanced effectively.

Regarding the embodiment described above, the new technical contents of the above-described embodiments can be summarized as follows.

While a part of or a whole part of the embodiment can be summarized as follows as the new techniques, the present invention is not necessarily limited only to the followings.

(Supplementary Note 1)

An encryption device which includes:

a key calculation unit 504 which calculates a derived key by a calculation using a first hash function set in advance by taking a plain text as a numerical value and an identifier corresponding thereto as input values;

a cipher-text-by-identifier generation unit 303 which generates a cipher-text-by-identifier acquired by encrypting the identifier by a calculation using the first hash function by taking the identifier and the derived key as input values;

a relative value generation unit 305 which generates relative values e, e' that are values used for a greater-than-and-less-than comparison assessment between the plain text and another plain text through performing a calculation using a second hash function set in advance by taking the derived key and the plain text as input values;

a relative value cipher-text concealment unit 307 which generates a relative value cipher-text acquired by encrypting the relative value through a calculation using the second hash function by taking the derived key, the identifier, and the relative value as input values; and a cipher-text generating/outputting function 506A which generates and outputs a character string constituted with the cipher-text-by-identifier and the relative value cipher-text as a cipher-text of the plain text.

(Supplementary Note 2)

The encryption device as depicted in Supplementary Note 1, wherein:

the cipher-text-by-identifier generation unit 303 includes a function which, regarding an arbitrary integer k from 1 to n, generates a k-th block value of the cipher-text-by-identifier from the k-th block of the derived key and the identifier for a given integer n; and the relative value generation unit 305 includes a relative value generating function which generates values of the k-th block corresponding to respective values of n-pieces of each data block sequence of the cipher-text-by-identifier as the relative values.

(Supplementary Note 3)

A cipher-text comparison system including the encryption device 510 as depicted in Supplementary Note 1 and a comparison processing device 514 which captures a first cipher-text and a second cipher-text generated by the encryption device by corresponding to each of different plain texts, wherein the comparison processing device 514 includes:

a relative value restoration unit 409 which separately restores the relative values e, e' corresponding to each of the plain texts through performing calculations based on the second hash function by taking the identifiers and the derived keys set by corresponding to each of the first and second cipher-texts, respectively as input values; and a relative value comparison assessment unit 411 which includes a greater-than-and-less-than comparison assessment function which performs a greater-than-and-less-than assessment on the different plain texts through performing a greater-than-and-less-than comparison on the relative values which correspond to the different plain texts, respectively.

(Supplementary Note 4)

The cipher-text comparison system as depicted in Supplementary Note 3, wherein:

a comparison unit 513 of the comparison processing device 514 includes in advance a maximum inconsistence counter determination unit which specifies a counter value j at which different values of the counter values appear first in the cipher-texts-by-identifiers c, c' as a maximum inconsistence counter value j; and the relative value restoration unit 409 of the comparison processing device 514 assesses whether or not functions of the relative value cipher-texts regarding the second hash function containing the maximum inconsistence counter value j and each of the relative values apply when restoring each of the relative values e, e', generates a pair of each of the relative values e, e' when assessed that the functions apply, and outputs the pair as restored relative values.

(Supplementary Note 5)

The cipher-text comparison system as depicted in Supplementary Note 4, wherein the relative value comparison assessment unit 411 includes:

a relative value difference calculating function which calculates a difference between the relative value e of the identifier ID and the relative value e' of the identifier ID' outputted from the relative value restoration unit 409; and an assessment result outputting function which outputs "0" as a symbol of an assessment result showing "document M>document N" when assessed that the document M of the identifier ID is greater than the document N of the identifier ID', and outputs "1" as a symbol of an assessment result showing "document N>document M" when assessed that the document N of the identifier ID' is greater than the document M of the identifier ID.

(Supplementary Note 6)

A cipher-text encryption method used in a cipher-text comparison system which includes an encryption device which encrypts each of a plurality of plain texts as different numerical values and a comparison processing device which captures a first cipher-text and a second cipher-text generated by the encryption device by corresponding to each of the different plain texts and performs greater-than-and-less-than comparison processing on both documents, and the cipher-text encryption method includes:

calculating a derived key by a calculation using a first hash function set in advance by taking the plain text as the numerical value and an identifier corresponding thereto as input values (a derived key generating step);

generating a cipher-text-by-identifier acquired by encrypting the identifier by a calculation using the first hash function by taking the identifier and the derived key as input values (a cipher-text-by-identifier generating step);

generating relative values that are values used for a greater-than-and-less-than comparison assessment between the plain text and another plain text through performing a calculation using a second hash function set in advance by taking the derived key and the plain text as input values (a relative value generating step);

generating a relative value cipher-text acquired by encrypting the relative value through a calculation using the second hash function by taking the derived key, the identifier, and the relative value as input values (a relative value cipher-text generating step); and generating and outputting a character string constituted with the cipher-text-by-identifier and the relative value cipher-text as a cipher-text of the plain text (a cipher-text generating/outputting step), wherein contents of each of above-described steps are executed by the encryption device of the cipher-text comparison system;

restoring the relative values corresponding, respectively, to the plain text and the another plain text through performing calculations by using the second hash function based on the identifiers and the derived keys of each of a first and a second cipher-texts when the second cipher-text generated by corresponding to the another plain text and the first cipher-text are received as input (a relative value restoration processing step); and performing a greater-than-and-less-than assessment on the plain texts through performing a greater-than-and-less-than comparison on the relative values corresponding to the plain text and the another plain text, respectively (a plain text greater-than-and-less-than assessment processing step), wherein each of those processing steps are executed by the comparison processing device of the cipher-text comparison system.

(Supplementary Note 7)

A cipher-text comparison program used in a cipher-text comparison system which includes an encryption device which encrypts each of a plurality of plain texts as different numerical values and a comparison processing device which captures a first cipher-text and a second cipher-text generated by the encryption device by corresponding to each of the different plain texts and performs greater-than-and-less-than comparison processing on both documents, and the cipher-text program causes a computer provided to the encryption device to execute:

a key calculating function which calculates a derived key by a calculation using a first hash function set in advance by taking a plain text as a numerical value and an identifier corresponding thereto as input values;

a cipher-text-by-identifier generating function which generates a cipher-text-by-identifier acquired by encrypting the identifier by a calculation using the first hash function by taking the identifier and the derived key as input values;

a relative value generating function which generates relative values that are values used for a greater-than-and-less-than comparison assessment between the plain text and another plain text through performing a calculation using a second hash function set in advance by taking the derived key and the plain text as input values;

a relative value cipher-text generating function which generates a relative value cipher text acquired by encrypting the relative value by a calculation using the second hash function by taking the derived key, the identifier, and the relative value as input values; and a cipher-text generating function which generates each character string used for a greater-than-and-less-than comparison assessment regarding the plain text as well as the another plain text constituted with the cipher-text-by-identifier and the relative value cipher-text.

This Application claims the Priority right based on Japanese Patent Application No. 2011-149520 filed on Jul. 5, 2011 and the disclosure thereof is hereby incorporated by reference in its entirety.

INDUSTRIAL APPLICABILITY

The present invention can be applied to the database system which manages the table information in which the numeric data are encrypted for the third parties and the administrator other than the legitimate user.

REFERENCE NUMERALS

303 Cipher-text-by-identifier generation unit
305 Relative value generation unit
307 Relative value concealment unit
408 Maximum inconsistence counter determination unit
409 Relative value restoration unit
411 Relative value comparison assessment unit
504 Derived key generation unit (key deriving unit)
506 Cipher-text generation unit
506A Cipher-text generating/outputting function
510 Encryption device (device A)
513 Comparison unit
514 Comparison processing device (device B)

The invention claimed is:

1. An encryption device, comprising:
a key calculation unit stored in a memory and configured to calculate a derived key by a calculation using a first hash function set in advance by taking a plain text as a numerical value and an identifier corresponding thereto as input values;
a cipher-text-by-identifier generation unit stored in the memory and configured to generate a cipher-text-by-identifier acquired by encrypting the identifier by a calculation using the first hash function by taking the identifier and the derived key as input values;
a relative value generation unit stored in the memory and configured to generate relative values e, e' that are values used for a greater-than-and-less-than comparison assessment between the plain text and another plain text through performing a calculation using a second hash function set in advance and taking a modulo (mod) operation, by taking the derived key and the plain text as input values;
a relative value cipher-text concealment unit stored in the memory and configured to generate a relative value cipher-text acquired by encrypting the relative value through a calculation using the second hash function and the modulo operation, by taking the derived key, the identifier, and the relative value as input values; and
a cipher-text generating/outputting function unit configured to generate and output a character string constituted with the cipher-text-by-identifier and the relative value cipher-text as a cipher-text of the plain text,
wherein:
the cipher-text-by-identifier generation unit stored in the memory includes a function which, regarding an arbitrary integer k from 1 to n, generates a k-th block value of the cipher-text-by-identifier from the k-th block of the derived key and the identifier for a given integer n, and
the relative value generation unit stored in the memory includes a relative value generating function which generates values of the k-th block corresponding to respective values of n-pieces of each data block sequence of the cipher-text-by-identifier as the relative values.

2. A cipher-text comparison system comprising:
an encryption device, comprising:
a key calculation unit stored in a memory and configured to calculate a derived key by a calculation using a first hash function set in advance by taking a plain text as a numerical value and an identifier corresponding thereto as input values;
a cipher-text-by-identifier generation unit stored in the memory and configured to generate a cipher-text-by-identifier acquired by encrypting the identifier by a calculation using the first hash function by taking the identifier and the derived key as input values;
a relative value generation unit stored in the memory and configured to generate relative values e, e' that are values used for a greater-than-and-less-than comparison assessment between the plain text and another plain text through performing a calculation using a second hash function set in advance and taking a modulo (mod) operation, by taking the derived key and the plain text as input values;
a relative value cipher-text concealment unit stored in the memory and configured to generate a relative value cipher-text acquired by encrypting the relative value through a calculation using the second hash function and the modulo operation, by taking the derived key, the identifier, and the relative value as input values; and
a cipher-text generating/outputting function unit configured to generate and output a character string constituted with the cipher-text-by-identifier and the relative value cipher-text as a cipher-text of the plain text; and
a comparison processing device which captures a first cipher-text and a second cipher-text generated by the encryption device by corresponding to each of different plain texts, wherein the comparison processing device comprises:
a relative value restoration unit, stored in the memory, which separately restores the relative values e, e' corresponding to each of the plain texts through performing calculations based on the second hash function and the modulo operation, by taking the identifiers and the derived keys set by corresponding to each of the first and second cipher-texts, respectively as input values; and
a relative value comparison assessment unit, stored in the memory, which includes a greater-than-and-less-than comparison assessment function which performs a greater-than-and-less-than assessment on the different plain texts through performing a greater-than-and-less-than comparison on the relative values which correspond to the different plain texts, respectively,
wherein:
the cipher-text-by-identifier generation unit stored in the memory includes a function which, regarding an arbitrary integer k from 1 to n, generates a k-th block value of the cipher-text-by-identifier from the k-th block of the derived key and the identifier for a given integer n, and
the relative value generation unit stored in the memory includes a relative value generating function which generates values of the k-th block corresponding to respective values of n-pieces of each data block sequence of the cipher-text-by-identifier as the relative values.

3. The cipher-text comparison system as claimed in claim 2, wherein:
a comparison unit, stored in the memory, of the comparison processing device comprises in advance a maximum inconsistence counter determination unit which specifies a counter value j at which different values of the counter values appear first in the cipher-texts-by-identifiers c, c' as a maximum inconsistence counter value j; and
the relative value restoration unit of the comparison processing device assesses whether or not functions of the relative value cipher-texts regarding the second hash function containing the maximum inconsistence counter value j and each of the relative values apply when restoring each of the relative values e, e', generates a pair of each of the relative values e, e' when assessed that the functions apply, and outputs the pair as restored relative values.

4. The cipher-text comparison system as claimed in claim 3, wherein
the relative value comparison assessment unit includes:
a relative value difference calculating function which calculates a difference between the relative value e of the identifier ID and the relative value e' of the identifier ID' outputted from the relative value restoration unit; and an assessment result outputting function which outputs "0" as a symbol of an assessment result showing "document M >document N" when assessed that the document M of the identifier ID is greater than the document N of the identifier ID', and outputs "1" as a symbol of an assessment result showing "document N >document M" when assessed that the document N of the identifier ID' is greater than the document M of the identifier ID.

5. A cipher-text encryption method used in a cipher-text comparison system which comprises an encryption device which encrypts each of a plurality of plain texts as different numerical values and a comparison processing device which captures a first cipher-text and a second cipher-text generated by the encryption device by corresponding to each of the different plain texts and performs greater-than-and-less-than comparison processing on both documents, the cipher-text encryption method comprising:

calculating a derived key by a calculation using a first hash function set in advance by taking the plain text as the numerical value and an identifier corresponding thereto as input values;

generating a cipher-text-by-identifier acquired by encrypting the identifier by a calculation using the first hash function by taking the identifier and the derived key as input values;

generating relative values that are values used for a greater-than-and-less-than comparison assessment between the plain text and another plain text through performing a calculation using a second hash function set in advance and taking a modulo (mod) operation, by taking the derived key and the plain text as input values;

generating a relative value cipher-text acquired by encrypting the relative value through a calculation using the second hash function and the modulo operation, by taking the derived key, the identifier, and the relative value as input values; and generating and outputting a character string constituted with the cipher-text-by-identifier and the relative value cipher-text as a cipher-text of the plain text, wherein contents of each of above-described steps are executed by the encryption device of the cipher-text comparison system;

restoring the relative values corresponding, respectively, to the plain text and the another plain text through performing calculations by using the second hash function based on the identifiers and the derived keys of each of a first and a second cipher-texts when the second cipher-text generated by corresponding to the another plain text and the first cipher-text are received as input; and performing a greater-than-and-less-than assessment on the plain texts through performing a greater-than-and-less-than comparison on the relative values corresponding to the plain text and the another plain text, respectively, wherein each of those processing steps are executed by the comparison processing device of the cipher-text comparison system, wherein:

the generating of the cipher-text-by-identifier includes a function which, regarding an arbitrary integer k from 1 to n, generates a k-th block value of the cipher-text-by-identifier from the k-th block of the derived key and the identifier for a given integer n, and the generating of relative values includes a relative value generating function which generates values of the k-th block corresponding to respective values of n-pieces of each data block sequence of the cipher-text-by-identifier as the relative values.

6. A non-transitory computer readable recording medium storing a cipher-text comparison program used in a cipher-text comparison system which comprises an encryption device which encrypts each of a plurality of plain texts as different numerical values and a comparison processing device which captures a first cipher-text and a second cipher-text generated by the encryption device by corresponding to each of the different plain texts and performs greater-than-and-less-than comparison processing on both documents, the cipher-text program causing a computer provided to the encryption device to execute, comprising:

a key calculating function which calculates a derived key by a calculation using a first hash function set in advance by taking a plain text as a numerical value and an identifier corresponding thereto as input values;

a cipher-text-by-identifier generating function which generates a cipher-text-by-identifier acquired by encrypting the identifier by a calculation using the first hash function by taking the identifier and the derived key as input values;

a relative value generating function which generates relative values that are values used for a greater-than-and-less-than comparison assessment between the plain text and another plain text through performing a calculation using a second hash function set in advance and taking a modulo (mod) operation, by taking the derived key and the plain text as input values;

a relative value cipher-text generating function which generates a relative value cipher text acquired by encrypting the relative value by a calculation using the second hash function and the modulo operation, by taking the derived key, the identifier, and the relative value as input values; and a cipher-text generating function which generates each character string used for a greater-than-and-less-than comparison assessment regarding the plain text as well as the another plain text constituted with the cipher-text-by-identifier and the relative value cipher-text, wherein:

the cipher-text-by-identifier generating function includes a function which, regarding an arbitrary integer k from 1 to n, generates a k-th block value of the cipher-text-by-identifier from the k-th block of the derived key and the identifier for a given integer n, and the relative value generating function includes generating values of the k-th block corresponding to respective values of n-pieces of each data block sequence of the cipher-text-by-identifier as the relative values.

7. An encryption device, comprising:

key calculator for calculating a derived key by a calculation using a first hash function set in advance by taking a plain text as a numerical value and an identifier corresponding thereto as input values;

cipher-text-by-identifier generator for generating a cipher-text-by-identifier acquired by encrypting the identifier by a calculation using the first hash function by taking the identifier and the derived key as input values;

relative value generator for generating relative values e, e' that are values used for a greater-than-and-less-than comparison assessment between the plain text and another plain text through performing a calculation using a second hash function set in advance and taking a modulo (mod) operation, by taking the derived key and the plain text as input values;

relative value cipher-text concealment generator for generating a relative value cipher-text acquired by encrypting the relative value through a calculation using the second hash function and the modulo operation, by taking the derived key, the identifier, and the relative value as input values; and a cipher-text generating/outputting function generator for generating and outputting a character string constituted with the cipher-text-by-identifier and the relative value cipher-text as a cipher-text of the plain text, wherein:

the cipher-text-by-identifier generator includes a function which, regarding an arbitrary integer k from 1 to n, generates a k-th block value of the cipher-text-by-identifier from the k-th block of the derived key and the identifier for a given integer n, and the relative value generator includes a relative value generating function which generates values of the k-th block corresponding to respective values of n-pieces of each data block sequence of the cipher-text-by-identifier as the relative values.

8. The encryption device as claimed in claim 1, further comprising a non-transient computer readable medium storing the key calculation unit, cipher-text-by-identifier generation unit, relative value generation unit, relative value cipher-text concealment unit, and cipher-text generating/outputting function for execution by a processor.

9. The encryption device as claimed in claim 1, further comprising a non-transitory computer readable medium executed by a central processor.

10. The encryption device as claimed in claim 1, wherein the relative value generation unit generates the relative values e, e' that are values used for the greater-than-and-less-than comparison assessment between the plain text and another plain text through performing a calculation using a second hash function set in advance by always taking the derived key and the plain text as input values, and wherein the relative value cipher-text concealment unit generates the relative value cipher-text acquired by encrypting the relative value through the calculation using the second hash function by taking always the derived key, the identifier, and the relative value as input values.

11. The encryption device as claimed in claim 7, further comprising a non-transitory computer readable medium executed by a processor.

* * * * *